(12) United States Patent  
Zarei

(10) Patent No.: US 7,030,511 B2  
(45) Date of Patent: Apr. 18, 2006

(54) SOFT HYBRID-ELECTRIC VEHICLE POWER SUPPLY CIRCUIT

(75) Inventor: Shahram Zarei, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 725 days.

(21) Appl. No.: 10/063,290

(22) Filed: Apr. 9, 2002

(65) Prior Publication Data

US 2003/0191576 A1  Oct. 9, 2003

(51) Int. Cl.  
*B60L 1/00* (2006.01)

(52) U.S. Cl. ............... 307/39; 307/9.1; 307/10.1; 180/65.1

(58) Field of Classification Search .......... 290/40 C  
See application file for complete search history.

(56) References Cited

U.S. PATENT DOCUMENTS 5,698,905 A * 12/1997 Ruthlein et al. ............ 290/32
5,767,636 A * 6/1998 Kanazawa et al. .......... 318/139
5,796,175 A * 8/1998 Itoh et al. ................. 307/10.1
5,998,884 A * 12/1999 Kitamine et al. .......... 307/10.1
6,177,734 B1 * 1/2001 Masberg et al. ............. 290/31
6,191,558 B1 * 2/2001 Arai et al. .................. 320/132
6,304,056 B1 * 10/2001 Gale et al. .................. 320/104
6,365,983 B1 * 4/2002 Masberg et al. ........... 290/40 C \* cited by examiner

*Primary Examiner*—Brian Sircus  
*Assistant Examiner*—Hal I. Kaplan  
(74) *Attorney, Agent, or Firm*—Artz & Artz, P.C.; David B. Kelley

(57) ABSTRACT

A soft hybrid-electric vehicle power supply circuit (14) is provided. The circuit includes a load sensor (19), which generates a load signal. A high-voltage bus (26) supplies a high voltage for a high-voltage load (30) and a low-voltage bus (28) is electrically coupled to and supplying a low-voltage to a low-voltage load (32). A converter circuit (24) is electrically coupled to the high-voltage bus (26), the low-voltage bus (28), and a high-voltage load (30). The converter circuit (24) maintains a predetermined minimum voltage level on the high-voltage load (30) by switching between the high-voltage bus (26) and the low-voltage bus (28) in response to the load signal. A method of maintaining the predetermined minimum voltage level is also provided.

22 Claims, 1 Drawing Sheet

SOFT HYBRID-ELECTRIC VEHICLE POWER SUPPLY CIRCUIT

BACKGROUND OF INVENTION

1. Technical Field

The present invention relates generally to hybrid electric vehicle systems, and more particularly to a method and apparatus for maintaining a minimum of 30 volts on a high-voltage load during vehicle engine high-loading periods.

2. Background of the Invention

Current hybrid-electric vehicles have two separate electrical power buses. One power bus is a high-voltage bus, having a voltage level of approximately 300 volts, from which power is drawn to start, accelerate, and propel a hybrid-electric vehicle. The second power bus is a low-voltage, having a voltage level of approximately 14 volts, from which vehicle electronics and other low-voltage accessories are powered. The voltage on the low-voltage power bus is generated from downconverting the voltage on the high-voltage power bus.

There is a continuous demand for incorporation of more and more electrical systems within automotive vehicles. With increase in electrical systems comes increased power consumption demands. In order to accommodate the desire for increased electrical power, proposals for vehicles having 42-volt systems rather than 14-volt systems have been drafted. There is currently an International Organization for Standardization (ISO) proposal that would require a vehicle 42V voltage bus to maintain a minimum of 30 volts during periods when an engine is running or powered "OFF", but not during engine start-up periods or for engine-critical and safety-related components. As such, requirements have been suggested for a minimum of 30 volts during high-loading periods. The high-loading periods include: vehicle acceleration while driving, vehicle acceleration from standstill, and vehicle engine start-up after every idle/stop or engine power "OFF" during vehicle idling. The 30-volt minimum would allow the 42-volt vehicle systems to operate appropriately during vehicle engine high-loading periods.

In the current hybrid-electric vehicles the 30-volt minimum standard requirement is not an issue because the current hybrid-electric vehicle does not have a 42-volt power bus rather it has a continuous high-voltage power supply at approximately 300 volts. Unfortunately, current hybrid-electric vehicles have other disadvantages that have caused vehicle engineers to look into other forms of hybrid electric vehicles. The disadvantages are highly due to the costs, space constraints, and weight of utilizing and producing the high-voltage power supply, as well as safety considerations with such a high-voltage.

A soft hybrid-electric vehicle is being considered in replacement of current hybrid-electric vehicles. A soft hybrid-electric vehicle has a high voltage bus, which is at 42 volts rather than 300 volts, and a low-voltage bus at 14 volts. The high-voltage bus supplies the 42 volts to high-voltage loads that require a minimum of 30 volts to operate. The 30-volt minimum requirement becomes an issue in a soft hybrid-electric vehicle. During vehicle engine high-loading periods the high-voltage bus can collapse, or in other words drop below 30 volts. When the high-voltage bus drops below 30 volts, the high-voltage loads that require 30 volts to operate during normal operating conditions may malfunction or not operate.

There is a continuous effort to improve the functionality and cost of hybrid electric vehicles. Soft hybrid-electric vehicles are desirable in that they do not have some of the disadvantages associated with current hybrid-electric vehicles. Therefore, it would be desirable to provide a method and apparatus for maintaining a minimum of 30 volts on vehicle high-voltage loads during vehicle engine high-loading periods for a soft hybrid-electric vehicle.

SUMMARY OF INVENTION

The foregoing and other advantages are provided by a method and apparatus for maintaining a minimum of 30 volts on a high-voltage load during vehicle engine high-loading periods. A soft hybrid-electric vehicle power supply circuit is provided. The circuit includes a load sensor, which generates a load signal. A high-voltage bus supplies a high voltage for a high-voltage load and a low-voltage bus is electrically coupled to and supplying a low-voltage to a low-voltage load. A converter circuit is electrically coupled to the high-voltage bus, the low-voltage bus, and a high-voltage load. The converter circuit maintains a predetermined minimum voltage level on the high-voltage load by switching between the high-voltage bus and the low-voltage bus in response to the load signal.

A method of maintaining the predetermined minimum voltage level is also provided including generating a load signal. A high-voltage mode is performed when the load signal is greater than a predetermined load and a first direction signal is generated. A low-voltage mode is performed when the load signal is less than or equal to a predetermined load and a second direction signal is generated. A bi-directional switch is switched to an open state in response to the first direction signal and to a closed state in response to the second direction signal. An up-conversion is performed in response to the first direction signal and a down-conversion is performed in response to the second direction signal to maintain a predetermined minimum voltage level on the high-voltage load.

One of several advantages of the present invention is that it provides an apparatus and method for maintaining a minimum voltage level of 30 volts across high-voltage loads of a soft hybrid-electric vehicle thereby allowing high-voltage loads to operate accordingly during engine high-loading periods.

Another advantage of the present invention is that it isolates a soft hybrid electric vehicle high-voltage power supply during high-loading periods so that it may be exclusively dedicated to supplying power to propel the vehicle rather than supplying power to other high-voltage loads.

The present invention itself, together with attendant advantages, will be best understood by reference to the following detailed description, taken in conjunction with the accompanying figures.

BRIEF DESCRIPTION OF DRAWINGS

For a more complete understanding of this invention reference should now be had to the embodiments illustrated in greater detail in the accompanying figures and described below by way of examples of the invention wherein.

DETAILED DESCRIPTION

Figure 1:
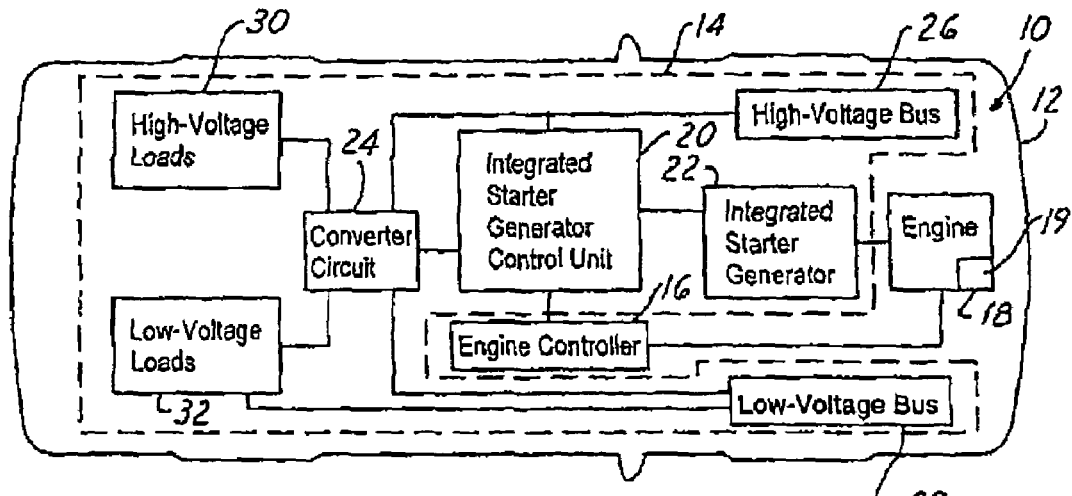
FIG. 1 is a block diagrammatic view of a soft hybrid-electric vehicle power supply system for a soft hybrid-electric vehicle in accordance with an embodiment of the present invention.

In each of the following figures, the same reference numerals are used to refer to the same components. While the present invention is described with respect to a method and apparatus for maintaining a minimum of 30 volts on a high-voltage load during vehicle engine high-loading periods, the present invention may be adapted to be used in various systems including: automotive vehicle systems, control systems, hybrid-electric vehicle systems, or other applications requiring the maintenance of a predetermined minimum voltage.

In the following description, various operating parameters and components are described for one constructed embodiment. These specific parameters and components are included as examples and are not meant to be limiting.

Referring now to FIG. 1, a block diagrammatic view of a soft hybrid-electric vehicle power supply system 10 for a soft hybrid-electric vehicle 12 in accordance with an embodiment of the present invention is shown. The system 10 includes a soft hybrid-electric vehicle power supply circuit 14 and an engine controller 16 electrically coupled to an engine 18, which propels the vehicle 12. The supply circuit 14 provides electrical power to the engine 18 during vehicle engine high-loading periods. The engine controller 16 receives a load signal from a load sensor 19 and transmits the load signal to the circuit 14 as well as controlling the performance of the engine 18.

Figure 2:
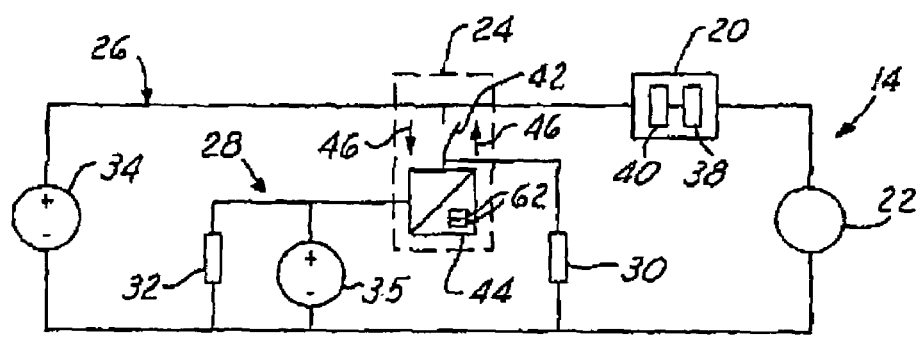
FIG. 2 is a schematic diagram of a soft hybrid-electric vehicle power supply circuit for the soft hybrid-electric vehicle in accordance with an embodiment of the present invention.

The supply circuit 14 includes an integrated starter generator (ISG) control circuit 20 electrically coupled to an ISG 22, which supplies power to the engine 18 as needed. The supply circuit 14 also includes a converter circuit 24 electrically coupled to the control circuit 20, a high-voltage bus 26, and a low-voltage bus 28. The converter circuit 24 maintains a predetermined voltage level on high-voltage loads 30 during vehicle engine high-loading periods. The high-voltage loads may be 42-volt loads having an approximate minimum voltage requirement of 30 volts. Low-voltage loads 32 obtain power from the low-voltage bus 28, which is supplied by low-voltage device 35, as shown in FIG. 2. The low-voltage loads operate at approximately 12–14 volts.

Vehicle engine high-loading periods may include starting of the engine 18 and acceleration of the vehicle 12, as well as other high-loading conditions. The acceleration of the vehicle 12 in and of itself may include the following described scenarios having corresponding high-voltage modes. One possible scenario is when the vehicle 12 is accelerated during normal driving conditions in which the circuit 20 and engine controller 16 operate in a boost mode. In addition, the vehicle 12 may be accelerated at a higher rate, which requires additional power, from a standstill for which the circuit 20 and engine controller 16 operate in a launch assist mode. Another possible scenario is when vehicle 12 is re-started during a standstill. During a standstill, such as in high traffic situations, the engine 18 is powered "OFF" to conserve energy. Upon determination to accelerate the vehicle 12 the engine 18 is re-powered "ON" to accelerate the vehicle 12 in which the circuit 20 and engine controller 16 operate in an idle/start mode. Other possible high-loading scenarios known in the art may also be incorporated.

The load sensor 19 may be of any style known in the art for sensing engine load to aid in the determination of whether the engine 18 is experiencing a high-loading condition. The load sensor 19 may be a throttle position sensor, a current sensor, a voltage sensor, or other engine load sensor known in the art.

Referring now to FIG. 2, a schematic diagram of a soft hybrid-electric vehicle power supply circuit 14 for the vehicle 12 in accordance with an embodiment of the present invention is shown. The supply Circuit 14 includes a high-voltage energy storage device 34 with open circuit voltage at around 36 volts and operating at approximately 42 volts when the ISG is operating, and a low-voltage energy storage device 35 with open circuit voltage at approximately 12 volts and operating at approximately 14 volts when the converter circuit 24 is operating.

The ISG 22 converts electrical power from the high-voltage bus 26 into an approximate constant mechanical power to be used by engine 18. ISG 22 also converts mechanical power from the engine 18 into electrical power, which is supplied to the high-voltage bus 26.

The control circuit 20 includes an inverter 38 and an ISG controller 40. The inverter 38 processes power in order to operate ISG 22. Inverter 38 transfers and converts electrical power between the high-voltage bus 26 and the ISG 22. The inverter 38 transfers electrical power from the high-voltage bus 26 to the ISG 22 when the ISG 22 is operating as a motor. The inverter 38 converts electrical power from the ISG 22 to the high-voltage bus when the ISG 22 is operating as a generator. The ISG controller 40 determines when to convert the electrical power to the mechanical power, in response to whether the system 10 is operating in a high-loading period or is supplying electrical power to the high-voltage bus 26, respectively. In turn, the ISG controller 40 determines whether system 10 is to operate in a high-voltage mode or a low-voltage mode in response to the load signal received by the engine controller 16.

The converter circuit 24 includes a bi-directional switch 42 and a bi-directional converter 44. The converter 44 is electrically coupled to the switch 42 and includes internal voltage sensors 62. The operation of the bi-directional switch 42 can be controlled by converter 44, the control circuit 20, the engine controller 16, or a separate controller that has access to the load signal 19. The converter 44 controls direction of voltage conversion from either the high-voltage bus 26 to the low-voltage bus 28 or from the low-voltage bus 28 to the high-voltage bus 26 to maintain the predetermined minimum voltage level on the high-voltage load 30, which is represented by arrows 46.

The switch 42 is in an open state, during up-conversion or vehicle engine high-loading periods, when the converter 44 is converting voltage from the low-voltage device 35 to a voltage approximately greater than or equal to 30 volts to supply power to the high-voltage loads 30. The switch 42 is in a closed state, during down-conversion or vehicle engine low-loading periods, when the high-voltage loads are receiving power from the high-voltage device 34 and the ISG 22. During down-conversion the low-voltage device 35 may be recharging and the low-voltage loads may be receiving power not only from the device 35 but also the converter 44. Low-loading periods may include the vehicle 12 traveling at a relatively constant speed, deceleration of the vehicle, or other normal loading periods known in the art.

The controllers 16 and 40 and the converter 44 may be microprocessor based such as a computer having a central processing unit, memory (RAM and/or ROM), and associated input and output buses. The controllers 16 and 40 and the converter 44 may be a portion of a central vehicle main control unit, an interactive vehicle dynamics module, or a stand-alone controller. The controllers 16 and 40 and the converter 44 may also be simply solid-state digital or analog logic devices.

Figure 3:
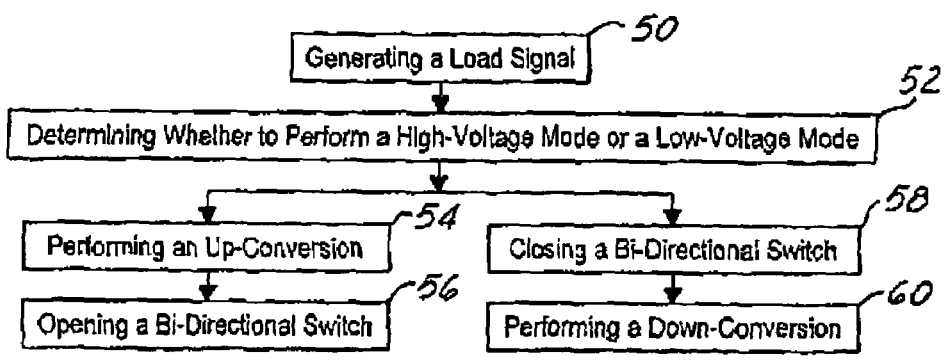
FIG. 3 is a logic flow diagram illustrating a method of maintaining a predetermined minimum voltage level on a high-voltage load for the soft hybrid-electric vehicle in accordance with an embodiment of the present invention.

Referring now to FIG. 3, a logic flow diagram illustrating a method of maintaining a predetermined minimum voltage level on the high-voltage loads 30 for the vehicle 12 in accordance with an embodiment of the present invention is shown.

In step 50, the load sensor 19 generates a load signal, which is generally related to load that the engine is experiencing.

In step 52, the ISG controller 40 determines whether the system 10 is to perform a high-voltage mode or a low-voltage mode. The ISG controller 40 determines a high-voltage mode when the load signal is greater than a predetermined load and generates a first direction signal and determines a low-voltage mode when the load signal is less than or equal to a predetermined load and generates a second direction signal. The high-voltage mode applies to up-conversion from the low-voltage bus 28 to the high-voltage bus 26. The low-voltage mode applies to down-conversion from the high-voltage bus 26 to the low-voltage bus 28. The ISG controller 40 signals the engine controller 16 and the converter 44 upon determining whether the system 10 is to perform a high-voltage mode or a low-voltage mode.

In step 54, when a high-voltage mode is to be performed the converter 44 performs an up-conversion by maintaining a closed state on switch 42 in response to a first direction signal. The converter 44 performs up-conversion from the low-voltage bus 28 to the high-voltage loads 30.

In step 56, the converter 44 opens switch 42 so that the high-voltage loads 30 are only receiving power from the low-voltage bus 28 and not from the high-voltage bus 26. Step 54 and 56 are performed sequentially to maintain continuous power for the high-voltage loads 30. The switch 42 is open during vehicle engine high-loading periods to convert voltage from the low-voltage energy storage device to a high voltage for the high-voltage loads 30. In so doing, the converter 44 is providing a minimum high-voltage level for the high voltage loads 30, during the high-loading periods.

In step 58, the converter 44 switches the switch 42 to a closed state in response to the second direction signal to perform a down-conversion. Upon completion of either step 56 or step 58 the converter circuit 24 may generate a converter circuit status signal indicating the status of the converter circuit 24, such as the state of the switch 42 or the status of the converter 44.

In step 60, the converter performs the down-conversion. High-voltage on the high-voltage bus 26 is converted into low-voltage to be supplied to the low-voltage bus 28. The high-voltage loads 30 receive power directly from the high-voltage bus 26.

In step 54, parameters for the up-conversion are determined to maintain a predetermined minimum voltage level on the high-voltage load. The converter 44 determines when to perform the voltage conversion, a power rating to apply for the voltage conversion, and duration of time to perform the voltage conversion and generates a voltage conversion signal using the internal voltage sensors 62.

The converter 44 in switching the switch 42 and performing a voltage conversion decouples the high-voltage loads 30 from the high-voltage bus 26 and couples the high-voltage loads 30 to the low-voltage bus 28 during vehicle engine high-loading periods, when the switch 42 is open.

The engine controller 16 signals the engine 18 to draw power from the high-voltage bus 26 in response to the converter circuit status signal. During normal-loading periods the converter 44 also couples the high-voltage loads 30 to the high-voltage bus 26 and decouples the high-voltage loads 30 from the low-voltage bus 28, when the switch 42 is closed.

The present invention provides a method of maintaining a minimum voltage level on a high-voltage load of a soft hybrid-electric vehicle during normal and high vehicle engine loading periods. The maintenance of a minimum voltage level on the high-voltage loads allows the high-voltage loads to operate appropriately during various engine-loading conditions. The present invention also isolates a soft hybrid electric vehicle high-voltage energy storage device during high-loading periods so that it may be exclusively dedicated to supplying power to propel the vehicle rather than supplying power to other high-voltage loads. The isolation of the high-voltage energy storage device provides increased power dedicated to accelerating the vehicle.

The above-described apparatus, to one skilled in the art, is capable of being adapted for various purposes and is not limited to the following systems: automotive vehicle systems, control systems, hybrid-electric vehicle systems, or other applications requiring the maintenance of a predetermined minimum voltage. The above-described invention may also be varied without deviating from the spirit and scope of the invention as contemplated by the following claims.

The invention claimed is:

1. A soft hybrid-electric vehicle power supply circuit for a soft hybrid-electric vehicle comprising:
a load sensor generating a load signal;
a high-voltage bus supplying a high voltage for a high-voltage load;
a low-voltage bus electrically coupled to and supplying a low-voltage to a low-voltage load; and
a converter circuit electrically coupled to said high-voltage bus, said low-voltage bus, and said high voltage load, said converter circuit maintaining a predetermined minimum voltage level on said high-voltage load by switching between said high-voltage bus and said low-voltage bus in response to said load signal to supply power to said high-voltage load from only one of said high-voltage bus and said low-voltage bus.

2. A circuit as in claim 1 further comprising an integrated starter generator supplying power to said high-voltage bus or an engine.

3. A circuit as in claim 2 further comprising:
an integrated starter generator control circuit electrically coupled to said integrated starter generator and said high-voltage bus, said integrated starter generator control circuit signaling said integrated starter generator in response to said load signal.

4. A circuit as in claim 3 wherein said integrated starter generator control circuit comprises:
an inverter processing electrical power between said high-voltage bus and said integrated starter generator; and
an integrated starter generator controller electrically coupled to said inverter and determining when to process said electrical power.

5. A circuit as in claim 1 wherein said converter circuit comprises:
a bi-directional switch; and a bi-directional converter electrically coupled to said bi-directional switch and controlling said bi-directional switch, said bi-directional converter controlling direction of voltage conversion from either said high-voltage bus to said low-voltage bus or from said low-voltage bus to said high-voltage bus to maintain said predetermined minimum voltage level on said high-voltage load.

6. A circuit as in claim 1 further comprising a high-voltage energy storage device electrically coupled to and supplying power to said high-voltage bus.

7. A circuit as in claim 1 further comprising a low-voltage energy storage device electrically coupled to and supplying power to said low-voltage bus.

8. A circuit as in claim 1 wherein said converter circuit maintains said predetermined minimum voltage level during soft hybrid-electric vehicle engine high-loading periods.

9. A circuit as in claim 1 wherein said predetermined minimum voltage level is approximately 30 volts.

10. A soft hybrid-electric vehicle power supply system for a soft hybrid-electric vehicle comprising:
    a engine propelling the soft hybrid electric vehicle;
    an engine controller determining the status of said engine and generating a load signal; and
    a soft hybrid-electric vehicle power supply circuit comprising;
        a high-voltage bus supplying a high voltage for a high-voltage load;
        a low-voltage bus electrically coupled to and supplying a low-voltage to a low-voltage load; and
        a converter circuit electrically coupled to said high-voltage bus, said low-voltage bus, and said high voltage load, said converter circuit maintaining a predetermined minimum voltage level on said high-voltage load by switching between said high-voltage bus and said low-voltage bus in response to said load signal;
        said converter circuit generating a converter circuit status signal upon switching voltage supply for said high-voltage load;
    said engine controller signaling said engine to draw power from said high-voltage bus in response to said converter circuit status signal.

11. A system as in claim 10 further comprising an integrated starter generator supplying power to said high-voltage bus or said engine.

12. A system as in claim 11 further comprising an integrated starter generator control circuit electrically coupled to said integrated starter generator and said high-voltage bus, said integrated starter generator control circuit adjusting performance of said integrated starter generator.

13. A system as in claim 12 wherein said integrated starter generator control circuit comprises:
    an inverter processing electrical power between said high-voltage bus and said integrated starter generator; and
    an integrated starter generator controller electrically coupled to said inverter and determining when to process said electrical power.

14. A system as in claim 10 wherein said converter circuit comprises:
    a bi-directional switch; and
    a bi-directional converter electrically coupled to said bi-directional switch and controlling said bi-directional switch, said bi-directional converter controlling direction of voltage conversion from either said high-voltage bus to said low-voltage bus or from said low-voltage bus to said high-voltage bus to maintain said predetermined minimum voltage level on said high-voltage load.

15. A system as in claim 10 further comprising a high-voltage energy storage device electrically coupled to and supplying power to said high-voltage bus.

16. A system as in claim 10 further comprising a low-voltage energy storage device electrically coupled to and supplying power to said low-voltage bus.

17. A system as in claim 10 wherein said converter circuit maintains said predetermined minimum voltage level during soft hybrid-electric vehicle engine high-loading periods.

18. A system as in claim 10 wherein said predetermined minimum voltage level is approximately 30 volts.

19. A method of maintaining a predetermined minimum voltage level on a high-voltage load for a soft hybrid-electric vehicle comprising:
    generating a load signal;
    performing a high-voltage mode when said load signal is greater than a predetermined load and generating a first direction signal and performing a low-voltage mode when said load signal is less than or equal to a predetermined load and generating a second direction signal;
    switching a bi-directional switch to an open state in response to said first direction signal and to a closed state in response to said second direction signal; and
    performing an up-conversion in response to said first direction signal and a down-conversion in response to said second direction signal to maintain a predetermined minimum voltage level on the high-voltage load.

20. A method as in claim 19 wherein performing an up-conversion and a down-conversion comprises:
    determining time to perform a voltage conversion;
    determining a power rating for said voltage conversion; and
    determining a duration of time to perform said voltage conversion.

21. A method as in claim 20 wherein switching said bi-directional switch and performing said voltage conversion comprises:
    decoupling a high-voltage load from said high-voltage bus and coupling said high-voltage load to a low-voltage bus during soft hybrid-electric vehicle engine high-loading periods; and
    coupling said high-voltage load to said high-voltage bus and decoupling said high-voltage load from said low-voltage bus during normal-loading periods.

22. A method as in claim 19 further comprising initiating a high-loading mode on a converting circuit before executing said high-loading made on an integrated starter generator.

* * * * *